United States Patent [19]
Chiba

[11] Patent Number: 5,834,855
[45] Date of Patent: Nov. 10, 1998

[54] MAXIMUM DEMAND POWER CONTROL APPARATUS

[75] Inventor: Seicho Chiba, Tokyo, Japan

[73] Assignee: Mark Tech Co., Ltd., Tokyo, Japan

[21] Appl. No.: 579,334

[22] Filed: Dec. 27, 1995

[30] Foreign Application Priority Data

Dec. 27, 1994 [JP] Japan .................................... 6-324365

[51] Int. Cl.⁶ ...................................................... H02J 1/00
[52] U.S. Cl. .............................. 307/31; 307/38; 364/492; 340/310.01
[58] Field of Search .................................. 307/31, 32, 33, 307/34, 35, 38, 39, 40; 364/492, 493; 340/310.01

[56] References Cited

U.S. PATENT DOCUMENTS

| | | | |
|---|---|---|---|
| 4,167,786 | 9/1979 | Miller et al. | 364/493 |
| 4,510,398 | 4/1985 | Culp et al. | 307/35 |
| 4,620,283 | 10/1986 | Butt et al. | 364/493 |
| 4,694,192 | 9/1987 | Payne et al. | 307/39 |
| 5,225,994 | 7/1993 | Arinobu et al. | 364/492 |
| 5,289,365 | 2/1994 | Caldwell et al. | 364/138 |
| 5,543,667 | 8/1996 | Shavit | 307/39 |
| 5,621,654 | 4/1997 | Cohen et al. | 364/493 |

FOREIGN PATENT DOCUMENTS

WO 9002379   3/1990   WIPO .

*Primary Examiner*—Jeffrey A. Gaffin
*Assistant Examiner*—Jonathan S. Kaplan
*Attorney, Agent, or Firm*—Jacox, Meckstroth & Jenkins

[57] ABSTRACT

A maximum demand power control apparatus is provided which can be easily wired up even when a large number of loads are to be controlled, and wherein the burden related to control does not fall on one device. In the construction, a sensor node 2 estimates the consumption power amount for a whole facility on the basis of the pulses outputted from an integrating wattmeter 1, and outputs power warnings information to a transmission line 5 based on the estimation. Control nodes 3a to 3c respectively control the consumption power of power loads 4a to 4c corresponding to the respective control nodes, according to power warning information received via the transmission line 5.

32 Claims, 4 Drawing Sheets

MAXIMUM DEMAND POWER CONTROL APPARATUS

BACKGROUND OF THE INVENTIONS

1. Field of the Invention

The present invention relates to a maximum demand power control apparatus for controlling maximum demand power within a single facility or within a single area, to below a predetermined value.

2. Description of the Related Art

Control apparatus for controlling the maximum power consumed for example within a single facility to below a predetermined value, have heretofore been constructed as shown in FIG. 6.

In FIG. 6, numeral 50 indicates a wattmeter for measuring the amount of power consumed by the whole facility, and outputting a pulse signal having a pulse number proportional to the measured amount of power. In this case the amount of power for the whole facility is measured for each certain time interval, with 1000 pulses being output for each 1 kWh of measured amount of power.

Numeral 51 indicates a demand controller for estimating the maximum demand power for the whole facility based on the pulse signal outputted from the wattmeter 50, and outputting as required, a power reduction signal. Numerals 52 a, 52b and 52c indicate power loads which consume power supplied to the facility. Priority levels are previously set for the respective power loads 52a to 52c, with, for example, a priority of 1 set for the power load 52a, a priority of 2 set for the power load 52b, and a priority of 3 set for the power load 52c.

With the above described maximum demand power control apparatus, the demand controller 51 estimates the consumption power for the whole facility from the amount of power (pulse number) outputted from the wattmeter 50, and when the estimated consumption power amount exceeds a previously set value, outputs power reduction signals to the respective loads in order from a low priority power load, depending on the amount that the set value is exceeded. In this way the power consumed by each of the respective loads 52a to 52c can be limited.

There are various types of power reducing signals depending on the type of power loads. For example, when the power load 52a is a machine tool, then the signal is an OFF signal which stops operation thereof, while when the load 52b is lighting equipment, then the signal is an intensity control signal which reduces the intensity of illumination.

In this way, the maximum demand power control apparatus controls the average power consumed within the facility for each certain time limit so as to be below said previously set value.

With the above described maximum demand power control apparatus, if there is a large number of power load to be controlled by the demand controller, then the number of lines connecting the demand controller and the power loads increases accordingly so that the wiring becomes unreasonably complex. Moreover, since a large number of electrical loads are controlled with a single demand controller, the burden of controlling the consumption amount of the respective power loads falls on one demand controller, making the control of a large number of electrical loads difficult.

SUMMARY OF THE INVENTION

The present invention addresses the above problem, with the object of providing a maximum demand power control apparatus which can be easily wired up even when a large number of loads are to be controlled, and wherein the burden related to control does not fall on one device.

The maximum demand power control apparatus of the present invention first measure the total consumption of the total power load in a single facility of single area by a wattmeter, and the power warning apparatus forecasts the maximum demand power of the above-mentioned single facility of single ares from the measured total consumption power, and outputs power warning information based on this forecast. Then, at least one of the consumption power control apparatuses connected to the above-mentioned power warning apparatus by a pair of transmission lines controls power consumption of the power load that is has previously assigned based on the power warning information. Furthermore, a relay device is connected to the above-mentioned relay device by at least one additional transmission line controls the electrical power load assigned by the above-mentioned additional consumption power control apparatus based on the above-mentioned power warning information received by the above-mentioned relay device.

Here, the above-mentioned power warning apparatus may have a broadcast function which simultaneously sends power warning information to all consumption control apparatuses connected to the pair of transmision lines of to at least one of the additional transmission lines.

In addition, it is also possible that the above-mentioned transmission lines be an electrical lead which provides electrical power to the power warning apparatus and the consumption power control apparatus.

According to a fourth aspect of the invention, the apparatus for controlling maximum demand power as described above, is characterized in that the transmission control section has a broadcast function which can simultaneously output the power warning information to all consumption power control apparatus connected to the transmission line or to the other transmission line.

According to a fifth aspect of the invention, the apparatus for controlling maximum demand power as described above, is characterized in that the consumption power control apparatus comprises, a receiving control section for receiving power warning information outputted from the power warning apparatus, a power reduction signal generating section for outputting a power reduction signal for controlling consumption power, based on power warning information signals received by the receiving control section, and an output control section for outputting to a power load assigned thereto, a power reduction signal outputted from the power reduction signal generating section.

According to a sixth aspect of the invention, the apparatus for controlling maximum demand power as described above, is characterized in that the transmission line is an electrical lead which supplies power to the power warning apparatus and to the consumption power control apparatus.

With the maximum demand power control apparatus according to the present invention, the power warning apparatus estimates the maximum power consumed by all the power loads within a single facility or within a single area using a power value measured by the wattmeter, and outputs power warning information to a paired transmission line based on the estimation. Since the consumption power control apparatus connected to the transmission line respectively controls the consumption power for each assigned power load based on the power warning information to thereby effect control, then the wiring is simplified, and the burden related to consumption power control of the total power consumption of all power loads within a single facility or a single area does not fall on one device.

Moreover since power warning information can also be sent to a consumption power control apparatus connected to another transmission line, then maximum demand power can still be controlled even when the number of power loads exceeds the permissible number of power loads for one paired transmission line.

Furthermore, since the transmission control section of the power warning apparatus has a broadcast function, then It is not necessary to specify one by one to all consumption power control apparatus connected to the transmission lines, the consumption power control apparatus for the transmission destinations. Therefore, the burden on the transmission control section inside the power warning apparatus can be reduced.

In addition, by using the power lines which supply power to the respective apparatus as a transmission line, then not only can the cost of the maximum demand power control apparatus be reduced, but also the work load at the time of installation can be lightened.

Further objects and aspects of the present invention will become apparent from the following description of the embodiments with reference to the accompanying drawings.

DESCRIPTION OF THE PREFERRED EMBODIMENTS

As follows is a description of embodiments according to the present invention with reference to the drawings. For the embodiments, an example is given for when maximum demand power control is carried out for a single facility.

Initially, a first embodiment will be described with reference to FIGS. 1 and 2.

Figure 1:
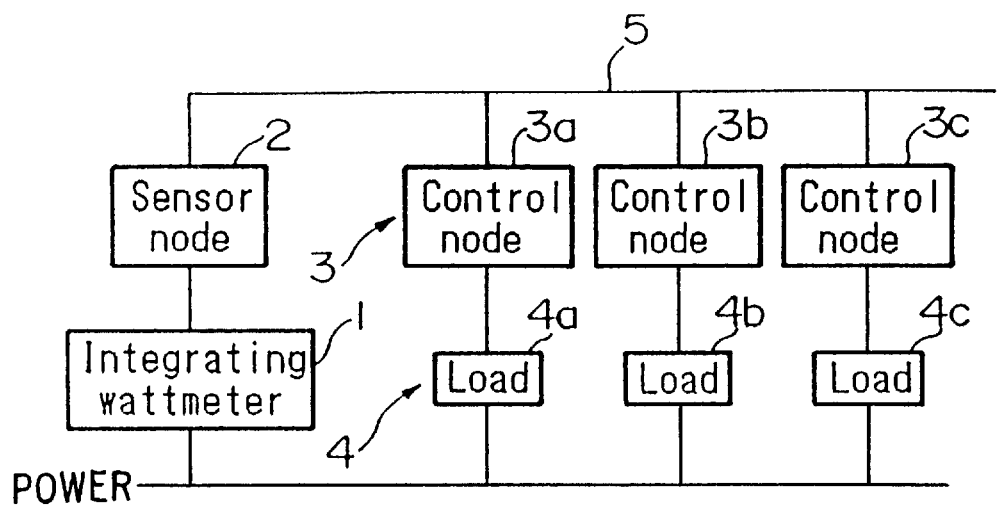
FIG. 1 is a block diagram showing the structure of a maximum demand power control apparatus according to a first embodiment of the present invention.

FIG. 1 is a block diagram showing the structure of a maximum demand power control apparatus according to the first embodiment.

Numeral 1 indicates an integrating wattmeter for measuring the power consumed by the whole facility, and outputting a pulse signal having a pulse number proportional to the measured power value. In this case the amount of power for the whole facility is measured for each certain time interval, with 1000 pulses being output for each 1 kWh of measured amount of power.

Numeral 2 indicates a sensor node which estimates the consumption power amount for the whole facility on the basis of the pulses outputted from the integrating wattmeter 1. Moreover, the sensor node 2 outputs power warning information to a transmission line 5 based on the estimated consumption power amount. Symbols 3a to 3c indicate control nodes for controlling the consumption power of power loads 4a to 4c to which each is respectively assigned, based on power warning information output to the transmission line 5. The power loads 4 constitute power consuming equipment, with power load 4a representing machine tools, power load 4b representing lighting equipment, and power load 4c representing air conditioner. The transmission line 5 is a single twisted pair wire. In the embodiment being described, the number of nodes that can be connected to the paired transmission line is 64.

Figure 2:
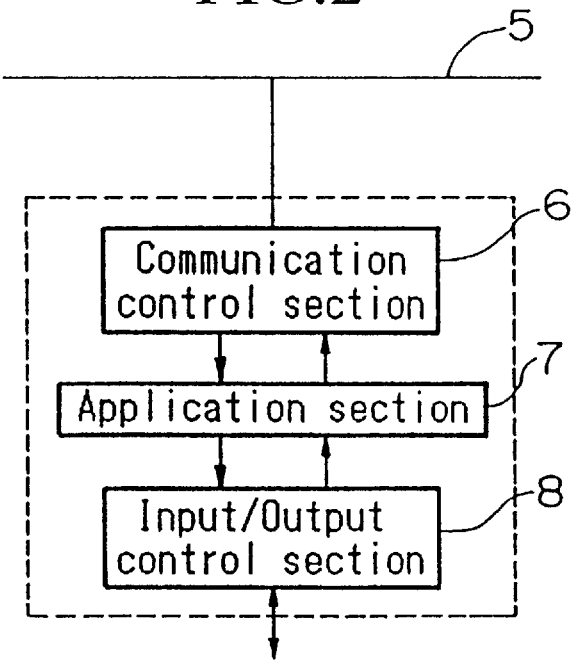
FIG. 2 is a block diagram showing the structure of a sensor node and a control node of the maximum demand power control apparatus of FIG. 1.

The construction of the sensor node 2 and the control nodes 3 is illustrated in FIG. 2.

Numeral 6 indicates a communication control section for transferring via the transmission line 5, data for carrying out communication with a communication control section within another node. Numeral 7 indicates an application section for determining the operation of the above-stated two types of nodes. Numeral 8 indicates an input/output control section for effecting the transfer of data to and from external equipment. Here the data communicated via the transmission line 5 comprises, for example, the transmission destination node address, the transmission source node address, and the transmission data (power warning information). The communication control section 6 for the transmission source performs data transmission to a specific communication control section by specifying an address assigned to the communication control section 6 for the transmission destination. Moreover, the transmission destination node address can includes a broadcast address instead of the address of a specific communication control section for the one time transmission of identical power warning information to all of the control nodes connected to the transmission line 5.

With the construction as described above, the application section 7 of for example the sensor node 2, estimates the power consumed by the loads 4a to 4c, based on the pulse signal received by the input/output control section 8. Then based on the estimated result, outputs to the transmission line 5 via the communication control section 6, power warning information together with address data specifying the control node for the transmission destination.

Moreover, the application section 7 of the control node carries out computational processing on the power warning information received by the communication control section 6. When the result calls for a reduction in consumption power of a respective corresponding power load, it outputs a power reduction signal to the load via the input/output control section 8.

This power reduction signal differs depending on the type of power load. For example, in the case of power load 4a, the signal is for switching the power to a machine tool on and off. In the case of power load 4b, the signal is an intensity control signal for adjusting illumination intensity, while in the case of power load 4c, the signal is an air quantity control signal for adjusting the strength of air flow of an air conditioner.

The operation of the above described maximum demand power control apparatus will now be explained.

Initially, the sensor node 2 estimates the amount of power that is consumed in 30 minutes by the electrical loads 4a to 4c, based on the number and the spacing of the pulses outputted from the integrating wattmeter 1. This estimate is made every 10 seconds. For example in estimating the amount of power consumed in 30 minutes, when the pulses outputted from the integrating wattmeter 1 during the initial 10 seconds of the estimate Is dense, the amount of power consumed in 30 minutes is estimated to be high in accordance with this density, while when the pulses during the lapse of a further 10 seconds is non-dense, then the value for the estimated amount of power is lower than that for the 10 seconds beforehand.

Furthermore, the sensor node 2 makes a broadcast transmission of the power warning information for the control nodes 3a to 3c, for each execution of the abovementioned estimate.

The power warning information is for example a finite integer value from 0 to 100, with a value from 0 to 50 meaning that the estimated power has fallen below a previously set consumption level, and a value from 51 to 100 meaning that the actual consumption power has risen above the previously set consumption level. More specifically, this means that the larger the power warning information, the larger the estimate that power exceeding the set power will be consumed.

The control nodes 3a to 3c output control signals (power reduction signal) corresponding to the power warning information received via the transmission line 5, for reducing the consumption power in the respective corresponding power loads 4a to 4c.

For example, the control node 3a outputs a power ON signal to the power load 4a when the power warning information is from 0 to 79, and outputs a power OFF signal when 80 or more. Moreover, the control node 3b outputs an intensity control signal to give normal intensity of illumination when the power warning information is from 0 to 49, outputs an intensity control signal to give an intensity of from 100% to 60% of the normal lighting time corresponding to the power warning information when this is from 50 to 69, while when 70 or more, it switches off the lights. Moreover, the control node 3c outputs an air quantity control signal to give an air quantity according to a set airflow value set in the air conditioner when the power warning information is from 0 to 39, outputs an air quantity control signal to give an air quantity from 100% to 40% of the set value corresponding to the power warning information when this is from 40 to 59, while when 60 or more, it shuts off the air control operation.

With the maximum demand power control apparatus according to the present embodiment as described above, a network is constructed within a single facility using the transmission line 5 and the above-stated two types of nodes. The maximum demand power for the whole facility is then controlled by controlling the consumption power of the power loads which each correspond to a respective control node, based on the power warning information output by the sensor node 2 to the transmission line 5.

With the above described embodiment, the explanation has been given for the example where the sensor node 2 makes a broadcast transmission to the control nodes 3a to 3c. The control nodes for the transmission destination can however be specified by address data, and power warning information can be transmitted to a specific control node.

Moreover, in the embodiment a twisted pair wire is used for the transmission line. However instead of a twisted pair wire, it is also possible to use the power lines which supply power to the respective nodes.

A second embodiment of the present invention will now be described with reference to FIG. 3 and FIG. 4.

With this embodiment, a network is added to the construction of the first embodiment so as to cope with a larger sized facility.

Figure 3:
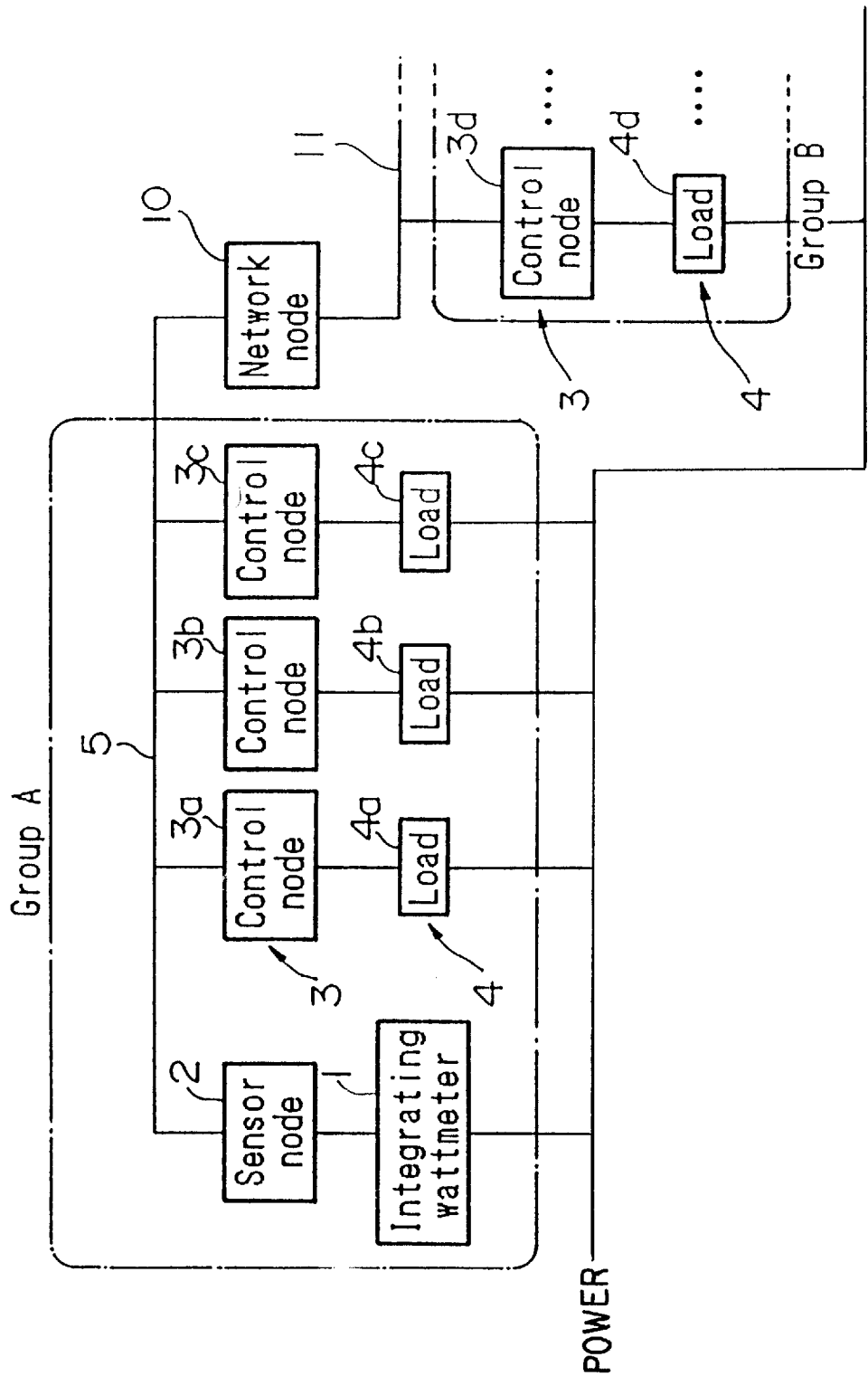
FIG. 3 is a block diagram showing the structure of a maximum demand power control apparatus according to a second embodiment of the present invention.
Figure 4:
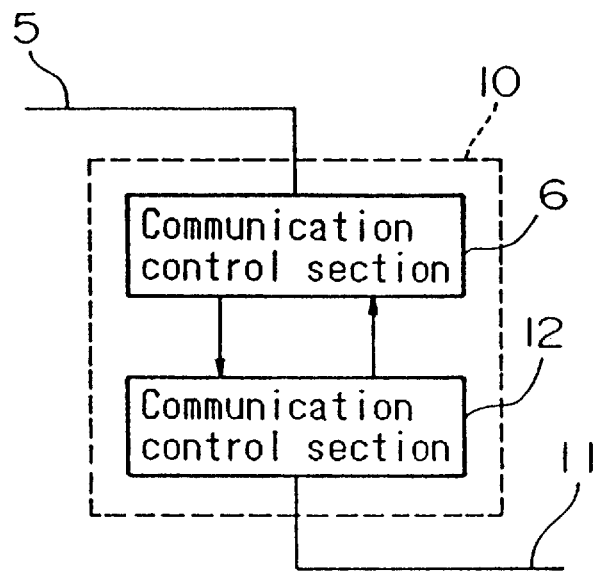
FIG. 4 is a block diagram showing the structure of a sensor node and a control node of the maximum demand power control apparatus of FIG. 3.

FIG. 3 is a block diagram showing the construction of a maximum demand power control apparatus according the second embodiment.

In FIG. 3, parts corresponding to the respective parts of FIG. 1 are denoted by the same symbols and description thereof is omitted. Points in the construction of FIG. 3 which differ from the construction of FIG. 1 will now be described.

Numeral 10 indicates a network node which relays communication between the respective nodes connected to the transmission line 5 and the respective nodes connected to a transmission line 11. The network node 10 as shown in FIG. 4 comprises a communication control section 6 for communicating via the transmission line 5, and a communication control section 12 for communicating via the transmission line 11. The communication control section 6 and the communication control section 12 exchange the data transmitted to the respective corresponding transmission lines mutually between each other. Moreover, the transmission of data between the communication control sections is carried out by a mutually common system with no relation to the communication systems of the transmission lines connected to the respective communication control sections.

In FIG. 3, a control node 3d and a power load 4d are connected to the transmission line 11 in a similar manner to the connections to the transmission line 5. Moreover, all of the nodes connected to the transmission line 5 (with the exception of the network node 10) comprise a group A, while all of the nodes connected to the transmission line 11 (with the exception of network node 10) comprise a group B.

With the maximum demand power control apparatus as described above, at first when the sensor node 2 makes a broadcast transmission, then as with the first embodiment, the control nodes 3a to 3d control the consumption power of the respective corresponding power loads 4a to 4d based on the respectively received power warning information. Moreover, when the sensor node 2 transmits power warning information for a specific control node, then this can be done by specifying the group and the node by the address data.

With the maximum demand power control apparatus of the second embodiment, the addition of the network nodes makes it possible to control the consumption power of loads exceeding the number of nodes permitted for the paired transmission line.

With this embodiment, it is not necessary for the communication systems using the transmission line 5 and the transmission line 11 to be the same systems. For example, when communication between the respective nodes in group A on the transmission line 5 is carried out by a communication system "a", and communication between the respective nodes in group B on the transmission line 11 is carried out by a communication system "b", since the transmission of data between the communication control section 6 and the communication control section 12 is carried out by a mutually common system, it is possible to relay between the transmission lines using different types of communication systems.

A third embodiment according to the present invention will now be described with reference to FIG. 5.

With this embodiment, a different type of sensor to that of the first embodiment is added, and the consumption power of the loads is controlled using a plurality of elements.

Figure 5:
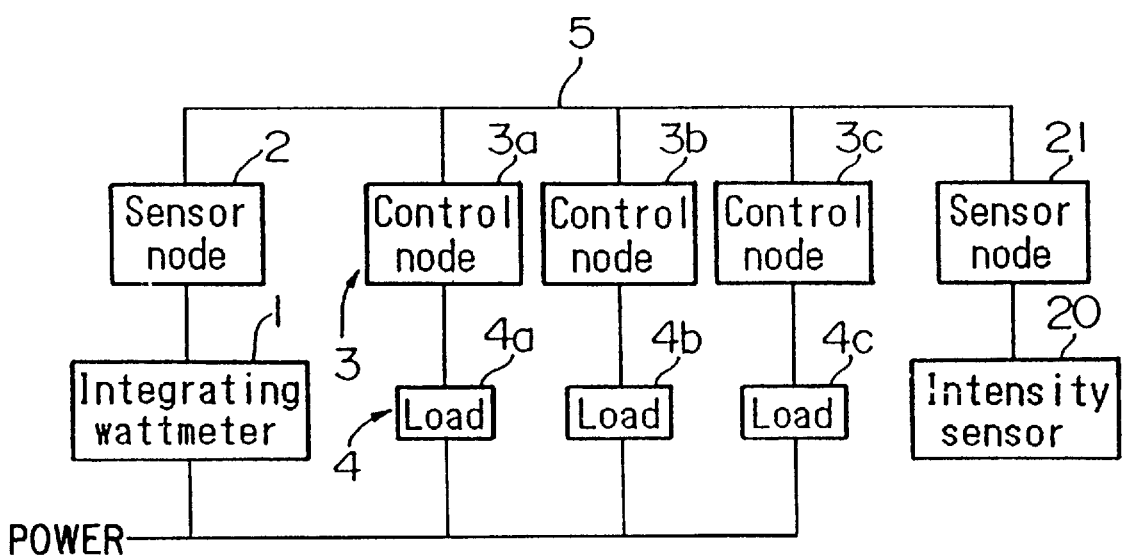
FIG. 5 is a block diagram showing the structure of a maximum demand power control apparatus according to a third embodiment of the present invention.
Figure 6:
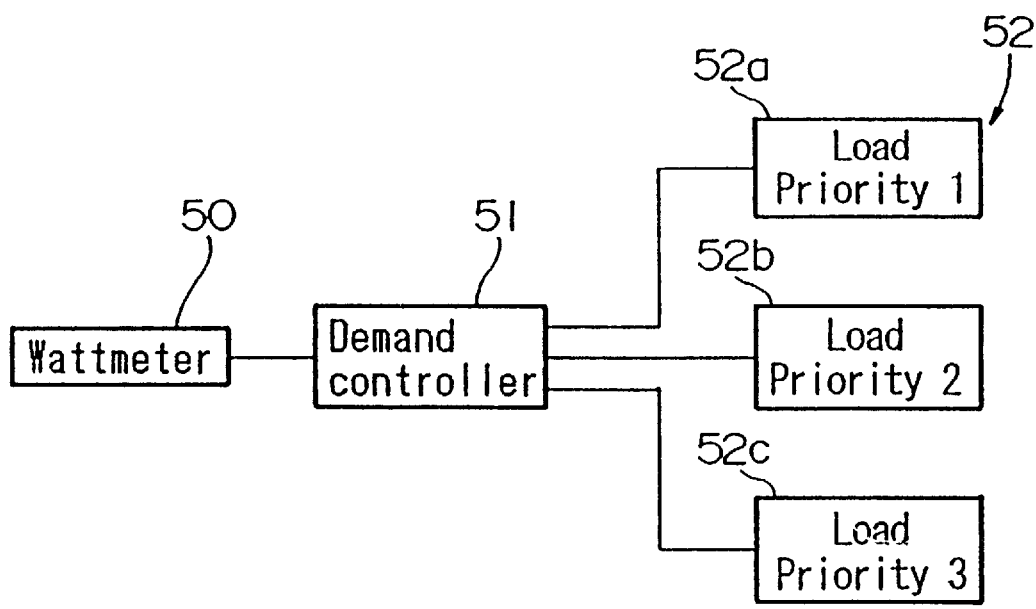
FIG. 6 is a block diagram showing the structure of a conventional maximum demand power control apparatus.

FIG. 5 is a block diagram showing the construction of a maximum demand power control apparatus according the third embodiment.

In FIG. 5, parts corresponding to the respective parts of FIG. 1 are denoted by the same symbols and description thereof is omitted. Points in the construction of FIG. 5 which differ from the construction of FIG. 1 will now be described.

Numeral 20 indicates an illumination intensity sensor which measures the intensity at a location where the power load 4b is installed, and outputs measured intensity data. Numeral 21 indicates a sensor node which transmits to the control node 3b, intensity information based on the received intensity data.

The control node 3b in the third embodiment carries out consumption power control of the power load 4b using the power warning information, and also by comparing the intensity information from the sensor node 21 with a previously set theoretical intensity value for the installation location. When power warning information and intensity information are output simultaneously from the sensor node 2 and the sensor node 21, then the control node 3b makes a judgement according to the transmission source node address and gives priority to the receipt of the power warning information.

With the above described maximum demand power control apparatus, initially the control nodes 3a and 3c as described in the first embodiment, respectively control the consumption power of the power loads 4a and 4c using the power warning information sent from the sensor node 2. Moreover, the control node 3b adjusts the intensity of the power load 4b within the consumption power range limited by the power warning information so that the illumination information sent from the sensor node 21 becomes the theoretical intensity value.

With this arrangement, when for example the installation location of the power load 4b is one which receives sufficient sunshine, then when for example due to a fine day an intensity reaching the theoretical intensity value Is obtained from the entering sunshine, then even if the power warning information is for example at 40, the control node 3b switches off the power load 4b. Alternatively, when for example due to a cloudy day the intensity from the entering light does not meet the theoretical value, then the illumination intensity of the power load 4b is adjusted so as to correct the for the insufficient intensity. However, at this time when the power warning information is for example at 69, then the intensity of the power load 4b will not achieve the theoretical intensity, and will not be brighter than the 60% for the normal lighting time.

Since the maximum demand power control apparatus of the present embodiment controls the consumption power of the power loads using a plurality of elements (consumption power, intensity), then at the time of a surplus in the amount of consumption power for the whole facility, the consumption power can be appropriately controlled for the conditions at the power load installation locations.

With the present embodiment, the intensity sensor 20 and the sensor node 21 are added to the same transmission line 5 as that of the control node 3b. However it is also possible for the intensity sensor 20 and the sensor node 21 to be connected to another transmission line 11 via a network node as shown for example in FIG. 3.

With the invention as described above, since there is provided a wattmeter for measuring a total consumption power of all power loads within a single facility or within a single area, a power warning apparatus for estimating a maximum power demand for the single facility or the single area using a power value measured by the wattmeter, and outputting power warning information based on the estimated results, and at least one consumption power control apparatus for controlling the consumption power of a power load previously assigned thereto from among all of the power loads based on said power warning information, and the power warning apparatus and the consumption power control apparatus are connected by a single paired transmission line, then not only is the wiring simplified, but also the burden related to consumption power control of the respective power loads does not fall on one device.

Moreover, since by providing a relay device, power warning information can also be sent to a consumption power control apparatus connected to another transmission line, then maximum demand power can still be controlled even when the number of power loads exceeds the permissible number of power loads for one paired transmission line. As a result, not only is it possible to control the maximum demand power of a larger sized facility, but also the additional installation of consumption power control apparatus is relatively simple.

Moreover, since the transmission control section of the maximum demand power control apparatus has a broadcast function, then it is not necessary to specify one by one to all consumption power control apparatus connected to the transmission lines, the consumption power control apparatus for the transmission destinations. Therefore the burden on the transmission control section can be reduced.

In addition, by using as a transmission line, the power lines which supply power to the respective apparatus, then not only can the cost of the maximum demand power control apparatus of the present invention be reduced, but also the work load at the time of installation can be lightened.

What is claimed is:

1. An apparatus for controlling maximum demand power, said apparatus comprising:

a wattmeter for measuring a total consumption power of all power loads within a single facility or within a single area;

a power warning apparatus for estimating a maximum demand power for the single facility or the single area using a power value measured by said wattmeter, and also for outputting power warning information in response thereto;

at least one consumption power control apparatus for controlling the consumption power of a power load previously assigned thereto from among all of the power loads, based on said power warning information;

a pair of transmission lines for connecting said power warning apparatus and said at least one consumption power control apparatus;

a relay device connected to said power warning apparatus via said pair of transmission lines for receiving said power warning information;

at least one additional transmission line connected to said relay device; and at least one additional consumption power control apparatus connected to said power warning apparatus via said relay device and said at least one additional transmission line, wherein said at least one additional power consumption control apparatus controls the power consumption of a power load previously assigned thereto based on said power warning information output by said additional transmission line by means of said relay device.

2. An apparatus for controlling maximum demand power as claimed in claim 1, wherein said power warning apparatus comprises, an input control section for receiving a power value signal from said wattmeter;

a power warning information generating section for estimating maximum demand power of said all power loads using the power value signal received by said input control section, and outputting power warning information based on the estimated results, and a transmission control section for outputting to said transmission line, power warning information outputted from said power warning information generating section together with an address specifying any one consumption power control device from among consumption power control apparatuses connected to said pair of transmission lines or to at least one additional transmission line.

3. An apparatus for controlling maximum demand power as claimed in claim 2, wherein said transmission control section has a broadcast function which can simultaneously output said power warning information to all consumption power control apparatus connected to said transmission line or to at least one additional transmission line.

4. An apparatus for controlling maximum demand power as claimed in claim 3, wherein said transmission line is an electrical lead which supplies power to said power warning apparatus and to said consumption power control apparatus.

5. An apparatus for controlling maximum demand power as claimed in claim 2, wherein said transmission line is an electrical lead which supplies power to said power warning apparatus and to said consumption power control apparatus.

6. An apparatus for controlling maximum demand power as claimed in claim 1, wherein said consumption power control apparatus comprises, a receiving control section for receiving power warning information outputted from said power warning apparatus, a power reduction signal generating section for outputting a power reduction signal for controlling consumption power, based on power warning information received by said receiving control section, and an output control section for outputting to a power load assigned thereto, a power reduction signal output by said power reduction signal generating section.

7. An apparatus for controlling maximum demand power as claimed in claim 6, wherein said transmission line is an electrical lead which supplies power to said power warning apparatus and to said consumption power control apparatus.

8. An apparatus for controlling maximum demand power as claimed in claim 1, wherein said transmission line is an electrical lead which supplies power to said power warning apparatus and to said consumption power control apparatus.

9. A method for controlling power consumption among a plurality of loads, said method comprising the steps of:

sensing an amount of power consumed by said plurality of loads and generating a warning signal in response thereto;

transmitting said warning signal across a transmission line from a relay device associated with said sensor and coupled to said transmission line to at least one control node associated with at least one of said plurality of loads;

using said at least one control node to generate a control signal in response to said warning signal; and controlling at least one of said plurality of loads in response to said control signal.

10. The method as recited in claim 9 wherein said sensing step further comprises the step of:

sensing a plurality of pulses from a wattmeter.

11. The method as recited in claim 9 wherein said transmitting step further comprises the step of:

transmitting said warning signal across a transmission line to a plurality of control nodes associated with said plurality of loads, respectively.

12. The method as recited in claim 9 wherein said controlling step further comprises the step of:

reducing power consumed by at least one of said plurality of loads.

13. The method as recited in claim 9 wherein said method further comprises the step of:

generating said warning signal if said power consumed exceeds a predetermined amount.

14. The method as recited in claim 9 wherein said method further comprises the steps of:

determining a predetermined response for at least one of said predetermined loads if said sensed power exceeds a predetermined power amount.

15. The method as recited in claim 14 wherein said predetermined power amount is an integer less than or equal to 100.

16. The method as recited in claim 9 wherein said transmission step further comprises the step of:

transmitting said warning signal across a transmission line to a network node coupled to a second plurality of loads via a second transmission line.

17. An apparatus for controlling consumption power of a plurality of loads comprising:

a sensor for sensing the power consumed by said plurality of loads and for generating a warning signal in response thereto;

at least one control node coupled to at least one of said plurality of loads; and a transmission line coupling said sensor to said at least one control node, said sensor comprising a relay coupled to a power apparatus via said transmission line for supplying said power;

said at least one control node being responsive to said power signal to generate a control signal in response to said warning signal; and at least one of said plurality of loads being responsive to said control signal to reduce an amount of power consumed.

18. The apparatus as recited in claim 17 wherein said apparatus further comprises:

a wattmeter coupled to said sensor;

said sensor sensing a plurality of pulses generated by said wattmeter.

19. The apparatus a recited in claim 17 wherein said sensor generates said warning signal using an estimate of said power consumed.

20. The apparatus as recited in claim 17 wherein said at least one control node determines a predetermined response for at least one of said predetermined loads if said sensed power exceeds a predetermined power amount.

21. The apparatus as recited in claim 20 wherein said predetermined power amount is an integer less than or equal to 100.

22. The apparatus as recited in claim 21 wherein said apparatus further comprises:

a network node coupled to said transmission line and to a second transmission line;

at least one second control node coupled to said network node via said second transmission line;

a second plurality of loads coupled to said at least one second control node.

23. An apparatus for controlling maximum demand power, said apparatus comprising:

a wattmeter for measuring a total consumption power of all power loads within a single facility or within a single area;

a power warning apparatus for estimating a maximum demand power for the single facility or the single area using a power value measured by said wattmeter, and outputting power warning information based on the estimated results;

at least one consumption power control apparatus for controlling the consumption power of a power load previously assigned thereto from among all of the power loads, based on said power warning information;

a pair of transmission lines for connecting said power warning apparatus and said at least one consumption power control apparatus;

wherein said power warning device adds an address specifying any one of said at least one consumption power control devices or all of said at least one consumption power control devices to said power warning information and outputs them to said pair of transmission lines; and when the address added to said power warning information specifies a specific consumption power control device, said consumption power control device specified by said address controls consumption power of a power load self-assigned to said consumption power control device based on power warning information to which a relevant address was added, and when said address specifies all of said at least one consumption power control devices, each of said at least one power consumption devices controls consumption power of a power load respectively assigned thereto based on said power warning information to which a relevant address was added.

24. An apparatus for controlling maximum demand power, said apparatus comprising:

a wattmeter for measuring a total consumption power of all power loads within a single facility or within a single area;

a power warning apparatus for estimating a maximum demand power for the single facility or the single area using a power value measured by said wattmeter, and outputting power warning information based on the estimated results;

an intensity sensor for measuring an intensity of a specific range within the single facility or within the single area;

an intensity information output device for outputting intensity information based on an intensity measured by said intensity sensor;

at least one consumption power control device for controlling consumption power of a power load assigned in advance from among all said power loads based on said power warning information and said intensity information and a pair of transmission lines for connecting said power warning device, said intensity information output device and said at least one consumption power control device.

25. An apparatus for controlling maximum demand power, said apparatus comprising:

a wattmeter for measuring a total consumption power of all power loads within a single facility or within a single area;

a power warning apparatus for estimating a maximum demand power for the single facility or the single area using a power value measured by said wattmeter, and outputting power warning information based on the estimated results; and at least one consumption power control apparatus for controlling the consumption power of a power load previously assigned thereto from among all of the power loads, based on said power warning information wherein said power warning apparatus and said at least one consumption power control apparatus are connected by a single paired transmission line;

said power warning device forecasts said total power consumption consumed in a predetermined time period every predetermined time interval.

26. The apparatus of claim 25 wherein said predetermined time period is less than one hour.

27. The apparatus of claim 26 wherein said preceding time interval is less than one minute.

28. The apparatus of claim 26 wherein said predetermined time period is about 30 minutes.

29. The apparatus of claim 25 wherein said preceding time interval is less than one minute.

30. An apparatus for controlling maximum demand power as claimed in claim 25, wherein said power warning apparatus comprises, an input control section for receiving a power value signal from said wattmeter;

a power warning information generating section for estimating maximum demand power of said all power loads using the power value signal received by said input control section, and outputting power warning information based on the estimated results, and a transmission control section for outputting to said transmission line, power warning information outputted from said power warning information generating section together with an address specifying the consumption power control apparatus for the transmission destination.

31. An apparatus for controlling maximum demand power as claimed in claim 25, wherein said transmission control section has a broadcast function which can simultaneously output said power warning information to al consumption power control apparatus connected to said single paired transmission line.

32. An apparatus for controlling maximum demand power, said apparatus comprising:

a wattmeter for measuring a total consumption power of all power loads within a single facility or within a single area, a power warning apparatus for estimating a maximum demand power for the single facility or the single are using a power value measured by said wattmeter, and outputting power warning information based on the estimate results, at least one consumption power control apparatus for controlling the consumption power of a power load previously controlling the consumption power of a power load previously assigned thereto from among all of the power loads, based on said power warning information, a single paired transmission line for connecting said power warning apparatus and said at least one consumption power control apparatus, a relay device connected to said power warning apparatus for receiving said power warning information;

at least one additional transmission line connected to said relay device; and at least one additional consumption power control apparatus connected to said power warning apparatus via said relay device and said at least one additional transmission line, wherein said at least one additional power consumption control apparatus controls the power consumption of a power load previously assigned thereto based on said power warning information, wherein said power warning device forecasts said total power consumption consumed in a predetermined time period every predetermined time interval.

* * * * *